(12) United States Patent
Choi et al.

(10) Patent No.: US 9,232,471 B2
(45) Date of Patent: Jan. 5, 2016

(54) METHOD AND APPARATUS FOR CONNECTING PORTABLE TERMINAL TO WLAN

(75) Inventors: Jong-Mu Choi, Gunpo-si (KR); Jeong-Hoon Han, Seoul (KR); Il-Sung Hong, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 973 days.

(21) Appl. No.: 12/796,959

(22) Filed: Jun. 9, 2010

(65) Prior Publication Data

US 2010/0315982 A1    Dec. 16, 2010

(30) Foreign Application Priority Data

Jun. 12, 2009   (KR) .................... 10-2009-0052131

(51) Int. Cl.
| | | |
|---|---|---|
| *H04W 52/02* | (2009.01) | |
| *H04W 76/02* | (2009.01) | |
| *H04W 84/12* | (2009.01) | |

(52) U.S. Cl.
CPC .......... *H04W 52/0216* (2013.01); *H04W 76/02* (2013.01); *H04W 84/12* (2013.01); *Y02B 60/50* (2013.01)

(58) Field of Classification Search
USPC .............. 370/310.2, 311, 318, 328–339, 349; 455/13.4, 127.1, 127.5, 343.1, 343.2, 455/343.3, 343.4, 343.5, 343.6, 422.1, 522, 455/572–574; 713/300, 310, 320–324, 330, 713/334
See application file for complete search history.

(56) References Cited

U.S. PATENT DOCUMENTS

| | | | |
|---|---|---|---|
| 7,672,695 B1* | 3/2010 | Rainnie et al. ................. 455/574 |
| 2005/0232200 A1 | 10/2005 | Jeong et al. | |
| 2006/0172736 A1* | 8/2006 | Nevo ........................... 455/435.1 |
| 2007/0049252 A1* | 3/2007 | Smith et al. .................. 455/411 |
| 2007/0177549 A1 | 8/2007 | Lo et al. | |
| 2008/0037444 A1* | 2/2008 | Chhabra ....................... 370/254 |
| 2008/0089300 A1* | 4/2008 | Yee ............................... 370/338 |
| 2008/0200166 A1* | 8/2008 | McCamon .................. 455/426.1 |
| 2008/0293404 A1* | 11/2008 | Scherzer et al. ........... 455/426.1 |
| 2010/0315983 A1* | 12/2010 | Choi et al. .................... 370/311 |

FOREIGN PATENT DOCUMENTS

KR    10-2005-0087896 A    9/2005

OTHER PUBLICATIONS

Vicomsoft, DHCP Q&A—Part One, 2002, 4 pages, http://www.vicomsoft.com/downloads/learning/dhcp_qa.pdf.*

(Continued)

*Primary Examiner* — Hoon J Chung
(74) *Attorney, Agent, or Firm* — Jefferson IP Law, LLP

(57) ABSTRACT

A method and an apparatus for connecting a portable terminal to a Wireless Local Area Network (WLAN) are provided. The method includes when a WLAN connection event occurs, performing a WLAN connection procedure by keeping a WLAN module in an awake state, and when the WLAN connection is complete, operating the WLAN module according to a Power Save Mechanism (PSM).

10 Claims, 6 Drawing Sheets

(56) References Cited

OTHER PUBLICATIONS

Jin et al., A Novel Idle Mode Operation in IEEE 802.11 WLANs, IEEE Communications Society, IEEE ICC, Jun. 1, 2006, pp. 4824-4829, Seoul, Republic of Korea.

Chen et al., A Seamless Handoff Mechanism for DHCP-Based IEEE 802.11 WLANs, IEEE Communications Letters, Aug. 2, 2007, pp. 665-667, vol. 11, No. 8, New Jersey, US.

IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications; IEEE Std 802.11-2007 (Revision of IEEE Std 802.1), IEEE Standard, Piscataway, NJ, USA, Jun. 12, 2007, pp. C1-C1184, XP017604022.

* cited by examiner

METHOD AND APPARATUS FOR CONNECTING PORTABLE TERMINAL TO WLAN

PRIORITY

The present application claims the benefit under 35 U.S.C. §119(a) of a Korean patent application filed in the Korean Intellectual Property Office on Jun. 12, 2009, and assigned Serial. No. 10-2009-0052131, the entire disclosure of which is hereby incorporated by reference.

BACKGROUND OF THE INVENTION

1. Field of the Invention

The present invention relates generally to a method and an apparatus for connecting a portable terminal to a Wireless Local Area Network (WLAN). More particularly, the present invention relates to a method and an apparatus for enhancing WLAN connection performance by turning on and off a Power Save Mechanism (PSM) function.

2. Description of the Related Art

Portable terminals are being researched and developed that have a Wireless Local Area Network (WLAN) function. More particularly, work is being done under the Institute of Electrical and Electronics Engineers (IEEE) 802.11 standard on techniques for reliable data transmission in the WLAN. For example, a method for guaranteeing reliability by using Request to Send/Confirm to Send (RTS/CTS) frames, as illustrated in FIG. 1, is suggested.

FIG. 1 illustrates a RTS/CTS scheme according to the related art.

Referring to FIG. 1, a source terminal (SRC) 111 having data 105 to transmit sends an RTS 101 to a destination terminal (DEST) 113. When the destination terminal 113 is capable of receiving data, the destination terminal 113 responds with a CTS 103. Another terminal (OTHER) 115 receiving the RTS/CTS is blocked from using the WLAN during times NAV(RTS) 121 and 123 required for the data transmission 105 by the source terminal 111, thereby guaranteeing reliable transmission.

Meanwhile, to reduce the power consumed by a WLAN module, the portable terminal adopts a Power Save Mechanism (PSM). An example of the PSM will be discussed below with reference to FIG. 2.

FIG. 2 illustrates a PSM according to the related art.

Referring to FIG. 2, when the portable terminal is compliant with the PSM, the portable terminal iteratively keeps the WLAN module in an awake state 203 based on a beacon interval 201 and switches the WLAN module to a sleep state 205. When there are packets to transmit and receive, the portable terminal stays in the awake state 203 by exchanging Traffic Indication Map (TIM)/ACKnowledgement (ACK) packets during the awake state 203 without transitioning into the sleep state 205. For example, when the portable terminal A 211 has a packet to send to the portable terminal B 213, the portable terminal A 211 transmits a TIM packet in the awake state 203. The portable terminal B 213, after receiving the TIM packet, sends an ACK to the portable terminal B 213 in the awake state 203 and then communicates data by exchanging packets without entering the sleep state 205. In contrast, the portable terminal C 215, which does not have any packets to transmit and receive, changes from the awake state 203 to the sleep state 205. Herein, each individual portable terminal using the PSM periodically stays in the awake state in order to receive multicast and broadcast packets, as described below with reference to FIG. 3.

FIG. 3 illustrates a relation between beacon and DTIM according to the related art.

Referring to FIG. 3, a beacon interval 301 and a Delivery Traffic Indication Map (DTIM) interval 303 are shown. The DTIM interval 303 is periodic. During the DTIM interval 303, each individual portable terminal using the PSM stays in the awake state in order to receive multicast and broadcast packets.

As for the multicast and broadcast frames, which are sent to an undefined number of the portable terminals, RTS/CTS may not be used and thus reliable transmission may not be achieved. Since the portable terminals using the PSM stay in the awake state to receive the multicast and broadcast packets only in the defined periodic interval, the portable terminals may not receive the multicast and broadcast frames. More specifically, in the WLAN connection procedure, the portable terminals may not receive the multicast and broadcast packets, such as Dynamic Host Configuration Protocol (DHCP) and Extensible Authentication Protocol (EAP). Accordingly, a probability of a failure of the WLAN connection is high. Portable terminals compliant with the IEEE 802.11 standard have the PSM function enabled and thus the multicast and broadcast packets may not be received. As a result, the probability of the WLAN connection failure rises.

SUMMARY OF THE INVENTION

Aspects of the present invention address at least the above-mentioned problems and/or disadvantages and provides at least the advantages described below. Accordingly, an aspect of the present invention is to provide a method and an apparatus for connecting a portable terminal to a Wireless Local Area Network (WLAN).

Another aspect of the present invention is to provide a method and an apparatus for enhancing WLAN connection performance by turning on and off a Power Save Mechanism (PSM) function in a portable terminal.

Still another aspect of the present invention is to provide a method and an apparatus for enhancing WLAN connection performance by keeping a WLAN module in an awake state in a WLAN connection procedure in a portable terminal.

In accordance with an aspect of the present invention, a method for connecting a portable terminal to a WLAN is provided. The method includes, when a WLAN connection event occurs, performing a WLAN connection procedure by keeping a WLAN module in an awake state, and, when the WLAN connection is completed, operating the WLAN module according to a PSM.

In accordance with another aspect of the present invention, an apparatus for connecting a portable terminal to a WLAN is provided. The apparatus includes a WLAN module for operating according to a PSM and performing a WLAN connection procedure, and a host processor for, when a WLAN connection event occurs, controlling to perform the WLAN connection procedure by keeping the WLAN module in an awake state, and when the WLAN connection is complete, for controlling to operate the WLAN module according to the PSM.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a technique for enhancing Wireless Local Area Network (WLAN) connection performance by turning on and off a Power Save Mechanism (PSM) function in a portable terminal. Herein, PSM denotes a mode in which a WLAN module iteratively transitions to an awake state and a sleep state. In the awake state, the WLAN module operates using an amount of power greater than a certain level and is capable of transmitting and receiving packets. In the sleep state, the WLAN module operates using an amount of power less than the certain level and does not transmit and receive packets.

Figure 1:
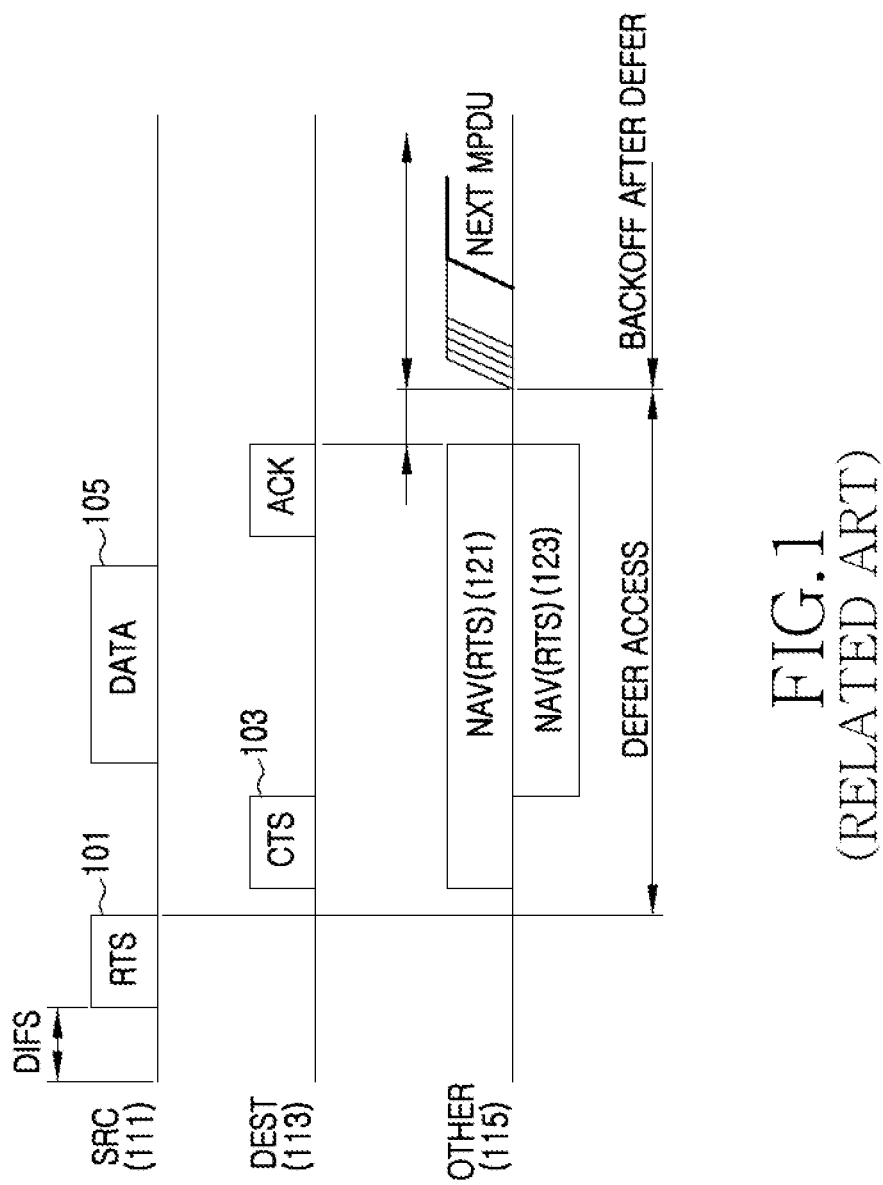
FIG. 1 illustrates a RTS/CTS scheme according to the related art.
Figure 2:
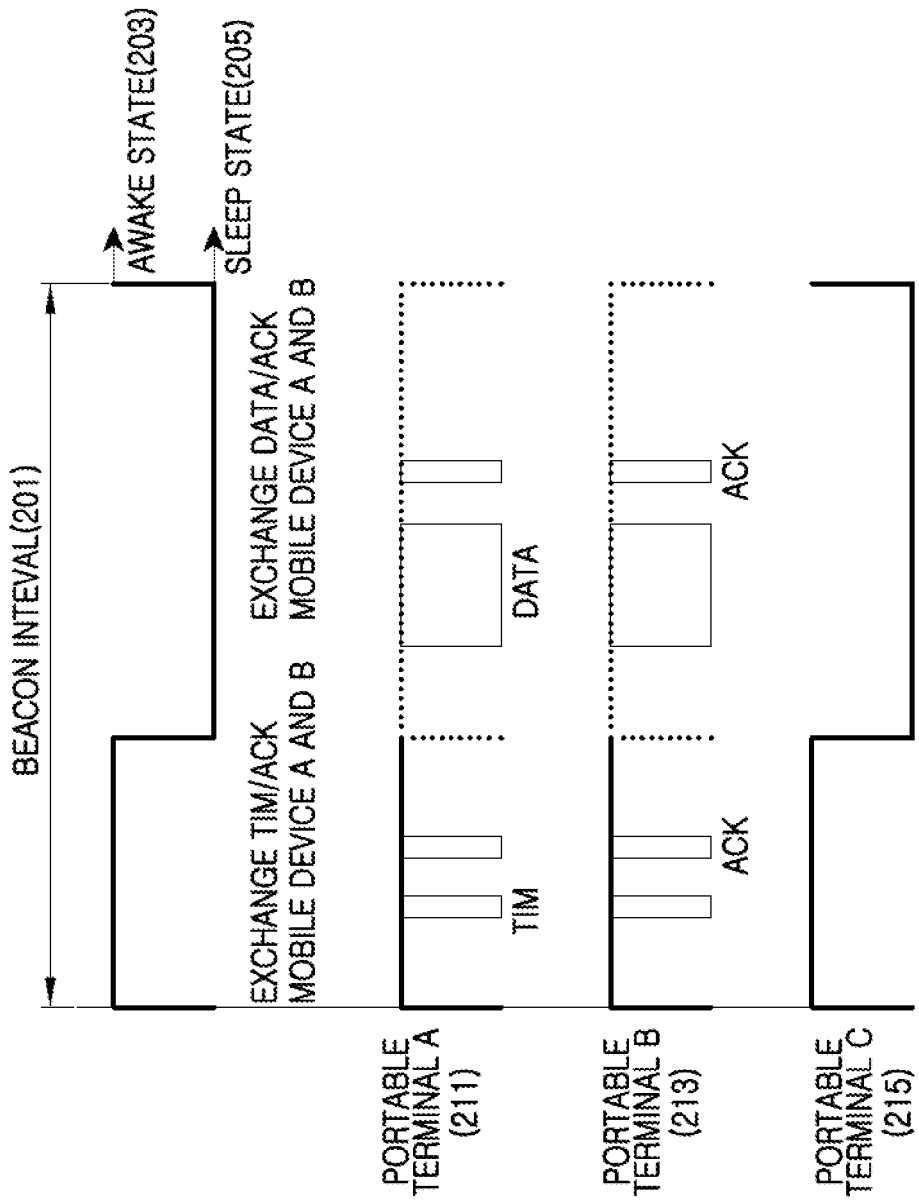
FIG. 2 illustrates a Power Save Mechanism (PSM) according to the related art.
Figure 3:
FIG. 3 illustrates a relation between beacon and DTIM according to the related art.
Figure 4:
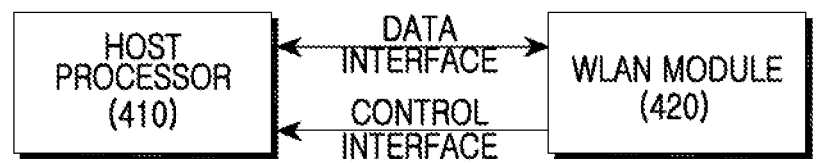
FIG. 4 illustrates a portable terminal according to an exemplary embodiment of the present invention.

FIG. 4 is a block diagram of a portable terminal according to an exemplary embodiment of the present invention.

Referring to FIG. 4, the portable terminal includes a host processor 410 and a WLAN module 420.

The host processor 410 controls and processes general operations of the portable terminal. When a WLAN connection event occurs, the host processor 410 controls and processes a function for connecting to an Access Point (AP) of the WLAN. More specifically, the host processor 410 controls and processes a function for preventing the WLAN module 420 from operating according to the PSM during the WLAN connection procedure. When the WLAN connection event occurs, the host processor 410 instructs the WLAN module 420 to carry out the WLAN connection procedure and to turn off the power save mode that is operating according to the PSM. When the WLAN module 420 reports of the successful WLAN connection, the host processor 410 instructs the WLAN module 420 to turn on the power save mode.

Under the control of the host processor 410, the WLAN module 420 carries out the WLAN connection procedure and transmits and receives data to and from the AP of the WLAN. In more detail, upon receiving the instructions to execute the WLAN connection procedure and to turn off the power save mode from the host processor 410, the WLAN module 420 performs the connection procedure with the AP of the WLAN while turning off the default power save mode. By turning off the power save mode, the WLAN module 420 remains in the awake state during the WLAN connection procedure. Herein, in the awake state, the WLAN module 420 operates using an amount of power greater than a certain level and is capable of transmitting and receiving packets. Accordingly, during the WLAN connection procedure, the WLAN module 420 is capable of receiving broadcast and multicast data.

When the WLAN connection procedure is complete, the WLAN module 420 reports the WLAN connection success to the host processor 410. When the host processor 410 instructs the WLAN module 420 to turn on the power save mode, the WLAN module 420 turns on the power save mode that had been off and then operates accordingly.

Figure 5:
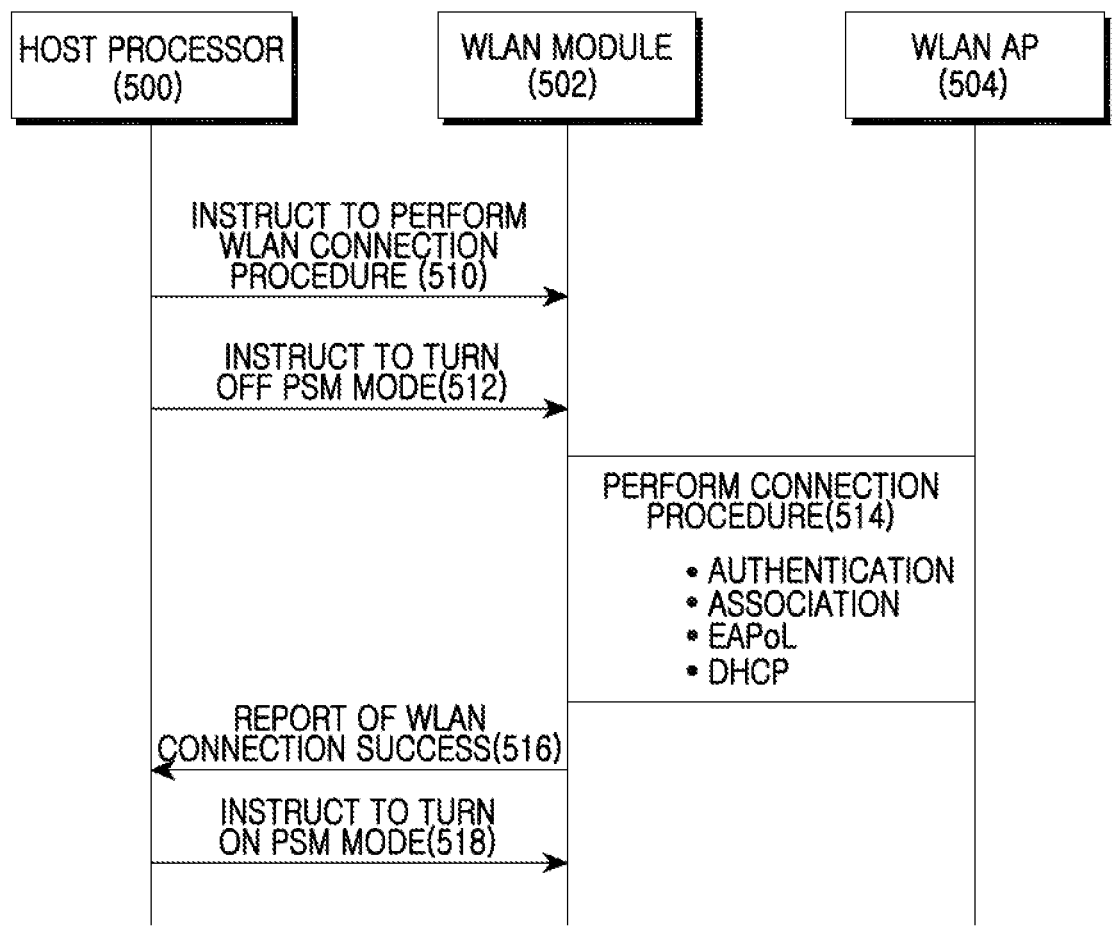
FIG. 5 illustrates signal flows according to a WLAN connection procedure in a portable terminal according to an exemplary embodiment of the present invention.

FIG. 5 depicts signal flows according to the WLAN connection procedure in a portable terminal according to an exemplary embodiment of the present invention.

Referring to FIG. 5, when the WLAN connection event occurs, the host processor 500 instructs the WLAN module 502 to perform the WLAN connection procedure in step 510 and instructs the WLAN module 502 to turn off the power save mode in step 512. Herein, steps 510 and 512 may occur in the opposite order or may be combined into a single step.

The WLAN module 502 receiving the WLAN connection procedure instruction and the power save mode off instruction carries out the connection procedure with the WLAN AP 504 while turning off the power save mode in step 514. Herein, the connection procedure can include authentication, association, Extensible Authentication Protocol encapsulation over LAN protocol (EAPoL), and Dynamic Host Configuration Protocol (DHCP), and may be carried out in the same manner as the conventional WLAN connection procedure.

When successfully completing the connection procedure with the WLAN AP 504, the WLAN module 502 reports the successful WLAN connection to the host processor 500 in step 516. Next, the host processor 500 instructs the WLAN module 502 to turn on the power save mode in step 518. The WLAN module 502 iteratively changes the awake state and the sleep state by turning on the power save mode.

Figure 6:
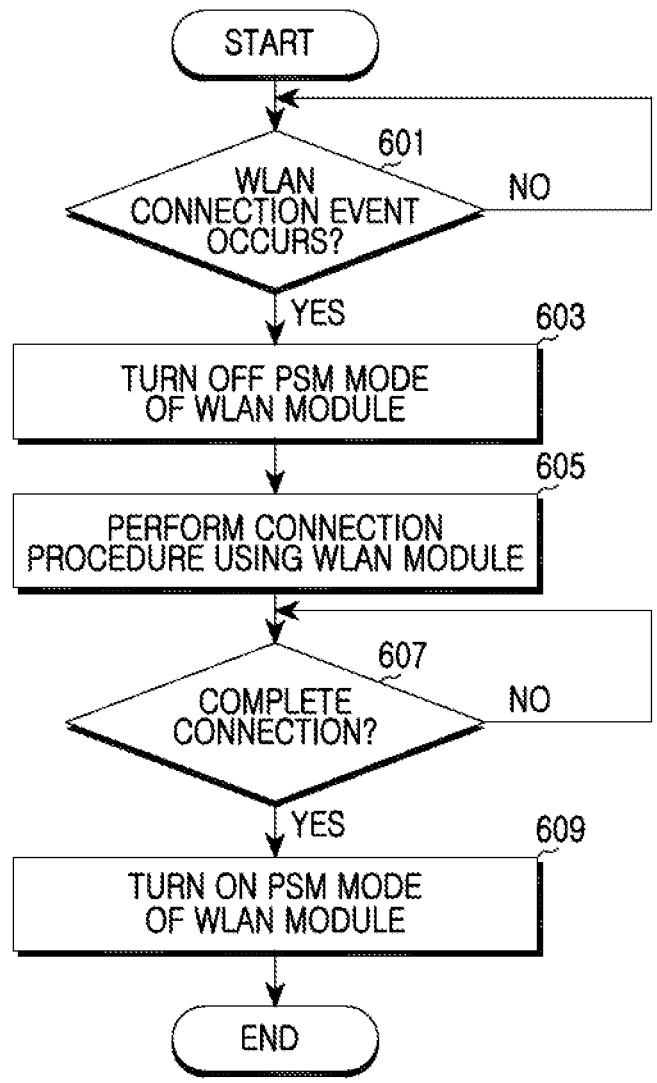
FIG. 6 illustrates operations of a portable terminal according to an exemplary embodiment of the present invention.

FIG. 6 illustrates operations of a portable terminal according to an exemplary embodiment of the present invention.

Referring to FIG. 6, when the WLAN connection event occurs in step 601, the portable terminal turns off the power save mode of the WLAN module 502 in step 603. The portable terminal conducts the connection procedure with the WLAN AP 504 in step 605. Herein, the connection procedure can include authentication, association, EAPoL, and DHCP, and may be carried out in the same manner as the conventional WLAN connection procedure.

In step 607, the portable terminal determines whether the connection procedure with the WLAN AP is complete. When the connection is complete, the portable terminal iteratively changes between the awake state and the sleep state by turning on the power save mode of the WLAN module 502 in step 609.

Next, the portable terminal finishes this process.

In exemplary embodiments of the present invention, the WLAN module is kept in the awake state by turning off the PSM function during the WLAN connection procedure in the portable terminal. Therefore, the WLAN connection performance can be enhanced by receiving the broadcast and multicast packets, and the connection time can be shortened by preventing the unnecessary connection retry caused by the broadcast and multicast DHCP and EAP.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for connecting a portable terminal to a Wireless Local Area Network (WLAN), the method comprising:
   detecting a WLAN connection event with a remote access point (AP) device in a power save mode (PSM) of a WLAN module;
   in response to detecting the WLAN connection event, turning off the PSM of the WLAN module and performing a WLAN connection procedure while turning off the PSM; and
   when a WLAN connection is complete, automatically turning on the PSM of the WLAN module and operating the WLAN module according to the PSM,
   wherein, when operating the WLAN module according to the PSM, the WLAN module iteratively changes between the awake state in which the WLAN module is capable of transmitting and receiving packets, and a sleep state in which the WLAN module is not capable of transmitting and receiving packets, and
   wherein the operating of the WLAN module according to the PSM comprises operating the WLAN module according to the PSM while the WLAN module is connected to the WLAN.

2. The method of claim 1, wherein the WLAN connection procedure comprises at least one of authentication, association, Extensible Authentication Protocol encapsulation over LAN protocol (EAPoL), and Dynamic Host Configuration Protocol (DHCP).

3. The method of claim 1, wherein the awake state and the sleep state have a different amount of power, and the awake state operates with an amount of power greater than the sleep state.

4. An apparatus for connecting a portable terminal to Wireless Local Area Network (WLAN), the apparatus comprising:
   a WLAN module configured to operate in a power save mode (PSM); and
   a host processor configured to detect a WLAN connection event with a remote access point (AP) device in the PSM of a WLAN module, in response to detecting the WLAN connection event, to turn off the PSM of the WLAN module and performing a WLAN connection procedure while turning off the PSM, and when a WLAN connection is complete, to automatically turn on the PSM of the WLAN module and operate the WLAN module according to the PSM,
   wherein, when operating the WLAN module according to the PSM, the WLAN module is further configured to iteratively change between the awake state in which the WLAN module is capable of transmitting and receiving packets, and a sleep state in which the WLAN module is not capable of transmitting and receiving packets, and
   wherein the operating of the WLAN module according to the PSM comprises operating the WLAN module according to the PSM while the WLAN module is connected to the WLAN.

5. The apparatus of claim 4, wherein the WLAN connection procedure comprises at least one of authentication, association, Extensible Authentication Protocol encapsulation over LAN protocol (EAPoL), and Dynamic Host Configuration Protocol (DHCP).

6. The apparatus of claim 4, wherein, upon completion of the WLAN connection procedure, the WLAN module is further configured to report a successful WLAN connection to the host processor.

7. The apparatus of claim 4, wherein the awake state and the sleep state have a different amount of power, and the awake state operates with an amount of power greater than the sleep state.

8. A method for connecting a portable terminal to a Wireless Local Area Network (WLAN), the method comprising:
   detecting a WLAN connection event with a remote access point (AP) device in a power save mode (PSM) of a WLAN module;
   in response to detect the WLAN connection event, performing a WLAN connection procedure by keeping a WLAN module in an awake state, wherein the WLAN module is kept in the awake state by turning off a the PSM; and
   when a WLAN connection is complete, automatically turning on PSM of the WLAN module and operating the WLAN module according to the PSM, and
   wherein, when the WLAN module is operated according to the PSM, the WLAN module iteratively changes between the awake state in which the WLAN is capable of transmitting and receiving packets, and a sleep state in which the WLAN module is not capable of transmitting and receiving packets, and
   wherein the operating of the WLAN module according to the PSM comprises operating the WLAN module according to the PSM while the WLAN module is connected to the WLAN.

9. The method of claim 8, wherein the WLAN connection procedure comprises at least one of authentication, association, Extensible Authentication Protocol encapsulation over LAN protocol (EAPoL), and Dynamic Host Configuration Protocol (DHCP).

10. The method of claim 8, wherein the awake state and the sleep state have a different amount of power, and the awake state operates with an amount of power greater than the sleep state.

* * * * *